(12) United States Patent
Ozaki et al.

(10) Patent No.: US 8,965,622 B2
(45) Date of Patent: Feb. 24, 2015

(54) VEHICULAR DRIVING SYSTEM AND DRIVING METHOD THEREOF

(75) Inventors: Tomonori Ozaki, Naka-gun (JP); Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 240 days.

(21) Appl. No.: 13/574,656

(22) PCT Filed: Jan. 20, 2011

(86) PCT No.: PCT/JP2011/050923
§ 371 (c)(1),
(2), (4) Date: Jul. 23, 2012

(87) PCT Pub. No.: WO2011/090093
PCT Pub. Date: Jul. 28, 2011

(65) Prior Publication Data
US 2012/0296495 A1    Nov. 22, 2012

(30) Foreign Application Priority Data

Jan. 25, 2010   (JP) ................................. 2010-013160

(51) Int. Cl.
G05D 1/00        (2006.01)
G05D 1/02        (2006.01)
(52) U.S. Cl.
CPC .............. *G05D 1/0278* (2013.01); *G05D 1/027* (2013.01); *G05D 1/0272* (2013.01); *G05D 2201/021* (2013.01)
USPC ........................................................ 701/24
(58) Field of Classification Search
USPC ........................................................ 701/2
See application file for complete search history.

(56) References Cited

U.S. PATENT DOCUMENTS

| 5,931,875 | A  | * | 8/1999  | Kemner et al. | 701/23 |
| 5,961,560 | A  | * | 10/1999 | Kemner | 701/24 |
| 6,044,312 | A  |   | 3/2000  | Sudo et al. | |
| 6,134,493 | A  | * | 10/2000 | Kaneko | 701/50 |
| 6,236,924 | B1 | * | 5/2001  | Motz et al. | 701/50 |

(Continued)

FOREIGN PATENT DOCUMENTS

| JP | 08-263138  | 10/1996 |
| JP | 2920017    | 7/1999  |
| JP | 2008-097632 | 4/2008 |

OTHER PUBLICATIONS

International Search Report issued Mar. 1, 2011 in International (PCT) Application No. PCT/JP2011/050923.

*Primary Examiner* — Thomas Tarcza
*Assistant Examiner* — Alex C Dunn
(74) *Attorney, Agent, or Firm* — Wenderoth, Lind & Ponack, L.L.P.

(57) ABSTRACT

In a vehicular driving system and a driving method thereof in which a vehicle is driven toward a loading point, a waiting point is set on a driving path. The vehicle drives from an entry point of a loading site to the waiting point along the driving path, and stands by at the waiting point until permission is given by a loader. When there is an order to change the loading point when the vehicle is at the waiting point or driving to the waiting point, a partial driving path is created, and the vehicle drives from the waiting point to the new loading point along the partial driving path. When there is no order to change the loading point when the vehicle is at the waiting point or driving to the waiting point, the vehicle drives from the waiting point to the original loading point along the driving path.

6 Claims, 6 Drawing Sheets

(56) References Cited

U.S. PATENT DOCUMENTS

| | | | |
|---|---|---|---|
| 6,246,932 B1 * | 6/2001 | Kageyama et al. | 701/24 |
| 6,484,078 B1 * | 11/2002 | Kageyama | 701/25 |
| 6,507,777 B1 * | 1/2003 | Pinlam et al. | 701/23 |
| 6,539,294 B1 | 3/2003 | Kageyama | |
| 6,799,100 B2 * | 9/2004 | Burns et al. | 701/25 |
| 7,398,137 B2 * | 7/2008 | Ferguson et al. | 700/275 |
| 7,756,615 B2 * | 7/2010 | Barfoot et al. | 701/25 |
| 8,626,541 B2 * | 1/2014 | Doan et al. | 705/7.11 |
| 2011/0153117 A1 * | 6/2011 | Koch et al. | 701/2 |
| 2012/0136509 A1 * | 5/2012 | Everett et al. | 701/2 |
| 2012/0136523 A1 * | 5/2012 | Everett et al. | 701/24 |
| 2012/0136524 A1 * | 5/2012 | Everett et al. | 701/24 |

* cited by examiner

VEHICULAR DRIVING SYSTEM AND DRIVING METHOD THEREOF

TECHNICAL FIELD

The present invention relates to a vehicular driving system and method thereof, and more particularly, to a vehicular driving system and method thereof for creating a driving path for vehicles along which vehicles are to drive from the entry point of a loading site to the loading point where a loader exists, and for making vehicles drive along the created driving path.

BACKGROUND ART

In a wide-area working site such as quarries and mines, in order to avoid accidents of workers due to fatigue caused by performing the carrying task of earth and sand, to achieve manpower saving and to improve productivity by elongating working hours, unmanned vehicular driving systems for putting unmanned dump trucks in operation in place of manned vehicles such as manned off-road dump trucks have been introduced.

Referring to FIG. 7, in a working site where unmanned dump trucks drive, there are areas called a loading site 1 and an earth unloading site 301. These areas are connected by a well-maintained conveying road called a haul road 302, by a side track called an access road 303 leading from the haul road 302 to each area or by a crossing.

The loading site 1, which is one of the areas, is a place where a loading operation of loading earth and sand onto dump trucks (called "vehicle" in the present invention) is performed, and an excavation operation by working vehicles (called "loader" in the present invention) such as wheel loaders (front-end loaders), backhoes and shovels (for example, hydraulic shovels) and a loading operation of loading earth and sand onto dump trucks are performed.

FIG. 1A illustrates a loading site 1.

Referring to FIG. 1A, a driving path 10 is created along which a vehicle 20 is to drive from an entry point 11 of the loading site 1 to a loading point 12 where a loader 30 exists, and the vehicle 20 is controlled to drive along the created driving path 10.

In this case, the vehicle 20 drives from the entry point 11 to arrive at the loading point 12 by way of a switch-back point 13 located near the loading point 12. In this regard, however, depending on loading patterns, the switch-backing is not always necessary. For example, there is a case in which the vehicle 20 drives from the entry point 11 toward the loader 30 while describing an arc and goes out the loading site 1.

Referring now to FIG. 1B, as the loader 30 such as a wheel loader conducts a movement or the like to a new excavation site, the loading point 12 changes its position accordingly. Incidentally, the reason why the above phrase, "a movement or the like" is used is that there is an occasion in which the loading point 12 changes as the working machine (bucket) swivels while the loader 30 itself is unmoved. For example, there is an occasion in which the loading point 12 moves by changing an approach angle relative to the loader 30 by swiveling the working machine or the like action while the loader 30 is unmoved. That is to say, the loading point 12 will change in the following three actions.
1) movement+swivel
2) movement only
3) swivel only There is often a case where a loading point 12 changes while the vehicle 20 is driving toward the loading point 12. When the loading point 12 changes, it is necessary to guide the vehicle 20 to a new loading point 12' by making the vehicle 20 drive along a corresponding new driving path 10' (shown in dashed line in FIG. 1B).

It is, however, difficult to make the vehicle 20 drive along the new driving path 10' while the vehicle 20 is driving along the driving path 10 after having passed through the entry point 11. This is because when the vehicle 20 has come sufficiently close to the entry point 11, time required for a computer to perform operations, etc. cannot be secured, which makes it difficult to change the driving paths in a short time. For the same reason, there may be a case where it is difficult to perform an abrupt change control in the driving path even though the vehicle 20 has not passed the entry point 11 yet.

Conventionally, to cope with the positional change in the loading point 12, the vehicle 20 is made stopped before the entry point 11 of the loading site 1 until a movement or the like of the loader 30 is completed so that a new loading point 12' is established and a new drive path 10' is created, and after the new drive path 10' is created, the vehicle 20 is allowed to enter the loading site 1 and drive along the new drive path 10'.

Incidentally, the following patent document 1 discloses that when loading point changes its position, a branching point is established on the drive path in accordance with the change of the position, and a branching path leading to the position changed loading point is created.

Patent document 1: Official gazette of Japanese patent no. 2920017

SUMMARY OF THE INVENTION

Problems to be Solved by the Invention

If, as described above, the vehicle 20 is made stopped before the entry point 11 of the loading site 1 each time the loader 30 conducts a movement or the like, and is allowed to enter the loading site 1 after the new drive path 10' is created, production efficiency would be remarkable deteriorated. Here, the production efficiency means an efficiency in go-and-return drive (cycle time) when the load quarried at an quarry, etc. is moved from the loading site 1 to another site with the use of the vehicle 20. Especially, in the case where plural vehicles 20 enter the loading site successively, waiting time accumulates, resulting in further deterioration in the production efficiency.

Therefore, in order to improve the production efficiency, it is desirable to construct a driving system that enables the vehicle 20 to be unstopped as much as possible (without waiting time) regardless of a moved position of the loader 30, but to keep on driving so that it can be as closer to the loader 30 as possible.

The present invention has been made in view of the foregoing circumstances, and the problems to be solved by the invention is to improve production efficiency by making a vehicle 20 drive toward a changed loading point 12' without fail even when the position of a loading point 12 is changed successively due to a movement or the like of a loader 30, and by making the vehicle 20 to keep on driving as close to the loader 30 as possible without stopping the vehicle 20 as much as possible (without waiting time).

Incidentally, in the invention described in the above-identified patent document 1, the position of a branching point is neither fixed, nor can be estimated in advance. Consequently, to cope with the position change of the loading point, a vehicle has no other choice than standing by before the entry point of a loading site. As a result, deterioration of the production efficiency cannot be avoided.

Measures to Solve the Problem

A first aspect of the invention is a vehicular driving system for creating a driving path for vehicles along which a vehicle is to drive from an entry point of a loading site to a loading point where a loader exists, and for making the vehicle drive along the created driving path, characterized in that, the system comprises:
driving path creating means for creating a driving path from an entry point to a loading point by way of a waiting point located in a neighborhood of the loading point based on position information on the loading point and position information on the entry point;
first driving control means for making the vehicle drive from the entry point to the waiting point along the driving path created by the driving path creating means based on information on the driving path;
waiting means for making the vehicle stand by at the waiting point until a permission is given by the loader;
partial driving path creating means for creating, when there is an order to change the position of the loading point from the loader to a supervising device and/or to the vehicle while the vehicle is standing by at the waiting point or driving between the entry point and the waiting point, a partial driving path from the waiting point to the position changed loading point based on position information on the position changed loading point and position information on the waiting point on the driving path before the loading point has moved; and
second driving control means for making, when there is not the order to change the position of the loading point from the loader to the control device and/or to the vehicle while the vehicle is standing by at the waiting point and driving between the entry point and the waiting point, the vehicle drive from the waiting point to the loading point along the driving path created by the driving path creating means based on the information on the driving path, and
for making, when there is the order to change the position of the loading point while the vehicle is standing by at the waiting point or driving between the entry point and the waiting point, the vehicle drive from the waiting point to the position changed loading point along the partial driving path created by the partial driving path creating means based on the information on the partial driving path.

A second aspect of the invention is characterized in that, in the first aspect of the invention,
the vehicular driving system is applied to a case where a plurality of vehicles drive along the driving path one after another,
when there is the order to change the position of the loading point from the loader to the supervising device and/or to the vehicle, the partial driving path creating means creates the partial driving path from the waiting point to the position changed loading point,
the driving path creating means creates a driving path from the entry point to the position changed loading point by way of a waiting point located at a position different from the position of the waiting point located on the partial driving path,
a preceding vehicle is made drive from the waiting point to the position changed loading point along the partial driving path created by the partial driving path creating means based on information on the partial driving path, and
a following vehicle is made drive from the entry point to the waiting point located at a position different from the position of the waiting point located on the partial driving path along the driving path created by the driving path creating means based on information on the driving path.

A third aspect of the invention is characterized in that, in the first or second aspects of the invention,
the vehicle is an unmanned vehicle and the loader is a manned vehicle,
the vehicular driving system further comprises a supervising device,
the vehicle, the supervising device and the loader are respectively provided with communication means for performing transmission/reception between the supervising device and the vehicle and between the supervising device and the loader,
the loader transmits an order to change position to the supervising device,
the supervising device creates a driving path and a partial driving path in accordance with the order to change position transmitted from the loader,
the supervising device transmits information on the driving path and the partial driving path to the vehicle, and
the vehicle drives based on the information on the driving path and the partial driving path transmitted from the supervising device, and stands by at the waiting point until the permission is given by the loader.

A fourth aspect of the invention is a vehicular driving method for creating a driving path for vehicles along which a vehicle is to drive from an entry point of a loading site to a loading point where a loader exists, and for making the vehicle drive along the created driving path, characterized by
creating a driving path from the entry point to the loading point by way of a waiting point located in a neighborhood of the loading point based on position information on the loading point and position information on the entry point;
making the vehicle drive from the entry point to the waiting point along the driving path based on information on the created driving path;
making the vehicle stand by at the waiting point until a permission is given by the loader;
creating, when there is an order to change the position of the loading point from the loader to a supervising device and/or to the vehicle while the vehicle is standing by at the waiting point or driving between the entry point and the waiting point, a partial driving path from the waiting point to the position changed loading point based on position information on the position changed loading point and position information on the waiting point on the driving path before the loading point has moved; and
making, when there is not the order to change the position of the loading point from the loader to the supervising device and/or to the vehicle while the vehicle is standing by at the waiting point and driving between the entry point and the waiting point, the vehicle drive from the waiting point to the loading point along the driving path created by the driving path creating means based on the information on the driving path, and
making, when there is the order to change the position of the loading point while the vehicle is standing by at the waiting point or driving between the entry point and the waiting point, the vehicle drive from the waiting point to the position changed loading point along the partial driving path created by the partial driving path creating means based on information on the partial driving path.

A fifth aspect of the invention is characterized by, in the fourth aspect of the invention, applying the vehicular driving method to a case where a plurality of vehicles drive along the driving path one after another, and when there is the order to change the position of the loading point from the loader to the supervising device and/or to the vehicle, creating, by the partial driving path creating means, the partial driving path from the waiting point to the position changed loading point, creating, by the driving path creating means, a driving path from the entry point to the position changed loading point by way of a waiting point located at a position different from the position of the waiting point located on the partial driving path, making a preceding vehicle drive from the waiting point to the position changed loading point along the partial driving path created by the partial driving path creating means based on information on the partial driving path, and making a following vehicle drive from the entry point to the waiting point located at a position different from the position of the waiting point located on the partial driving path along the driving path created by the driving path creating means based on information on the driving path.

Function of the Invention

Referring to FIG. 2, the function of the first aspect of the invention will be explained.

As illustrated in FIG. 2A, a waiting point 14 at which a vehicle 20 must stand by until permission is give by a loader 30 is set up on a driving path 10. A switch-back point 13, for example, is determined as the waiting point 14.

The vehicle 20 drives along the driving path 10 from an entry point 11 of a loading site 1 to the waiting point 14, and the vehicle 20 stands by at the waiting point 14 until permission is given by the loader 30.

As illustrated in FIG. 2B, when there is the order to change the position of a loading point 12 while the vehicle 20 is standing by at the waiting point 14 or is driving between the entry point 11 and the waiting point 14, a partial driving path 15 is created, and the vehicle 20 drives from the waiting point 14 to a position changed loading point 12' along the partial driving path 15.

On the other hand, when there is not the order to change the position of the loading point 12 while the vehicle 20 is standing by at the waiting point 14 and is driving between the entry point 11 and the waiting point 14, the vehicle 20 keeps on driving from the waiting point 14 to the loading point 12 along a driving path end portion 10a (FIG. 2A).

Referring to FIG. 2, the function of the second aspect of the invention will be explained.

It is assumed that plural vehicles 20 and 20' drive successively along the driving path 10.

When there is an order to change the position of the loading point 12, a partial driving path 15 is created from the waiting point 14 to a position changed loading point 12', and a new driving path 10' is created from the entry point 11 to the position changed loading point 12' by way of a waiting point 14' located at a position different from the position of the waiting point 14 located on the partial driving path 15.

As for a preceding vehicle 20, under the condition that there is an order to change the position of the loading point 12 while the preceding vehicle 20 is standing by at the waiting point 14 or is driving between the entry point 11 and the waiting point 14, the preceding vehicle 20 drives from the waiting point 14 to the position changed loading point 12' along the partial driving path 15, whereas as for a following vehicle 20', it drives along the new driving path 10' from the entry point 11 to the waiting point 14' located at a position different from the position of the waiting point 14 located on the partial driving path 15. Incidentally, the following vehicle 20' stands by at the waiting point 14' in the same manner, and then drives along either a new partial driving path not shown in the accompanying drawings or the original driving path end portion 10'a depending on occurrence or nonoccurrence of the position change in the loading point 12'.

In the third aspect of the invention, the vehicles 20, 20' are unmanned vehicles and the loader 30 is a manned vehicle. Separate from these vehicles 20, 20' and loader 30, a supervising device 40 is provided (FIG. 3).

When the position of the loading point changes, the loader 30 transmits information indicating the order to change position to the supervising device 40.

Having received this, the supervising device 40 creates driving paths 10, 10' and a partial driving path 15 in accordance with the position change order transmitted from the loader 30.

The supervising device 40 transmits information on the driving paths 10, 10' and the partial driving path 15 to the vehicles 20, 20'.

The vehicles 20, 20' drive based on the information on the driving paths 10, 10' and the partial driving path 15, and stand by at the waiting points 14, 14' until permission is given by the loader 30. Incidentally, since "stand by . . . until permission is given", the vehicles do not necessarily have to stop at the waiting points 14, 14'. If the drive permission has been given, the vehicles may pass through the waiting points 14, 14' as they are (without standing by).

Alternatively, the loader 30 or the vehicles 20, 20' may be provided with the function of the supervising device 40. In this case, communications on information are performed directly between the loader 30 and the vehicles 20, 20'.

As for the fourth aspect of the invention and the fifth aspect of the invention, they are the same as the first aspect of the invention and the second aspect of the invention, respectively.

Effect of the Invention

According to the first aspect of the invention and the fourth aspect of the invention, the vehicles 20, 20' are made stand by at the waiting point 14, and when the there occurs a position change in the loading point 12, the partial driving path 15 is created from the waiting point 14 to the position changed loading point 12', and the vehicle 20 is made drive along the partial driving path 15. Therefore, even in the case where the loading point 12 changes successively due to a movement or the like of the loader 30, it is possible for the vehicle 20 to drive without fail toward the loading point 12. Since the waiting point 14 is established close to the loading point 12 so that the vehicle 20 can drive up to the waiting point 14 without being stopped, it is possible for the vehicle 20 to keep on driving toward the loader 30 without making the vehicle 20 stopped (without waiting time) as much as possible. Thus, production efficiency can be improved. In the case where plural vehicles 20, 20' enter the loading site 1 one after another, waiting time becomes shorter, and as a result, the production efficiency will be improved further.

According to the second aspect of the invention and the fifth aspect of the invention, when there occurs the position change in the loading point 12, a preceding vehicle 20 drives along the partial driving path 15 from the waiting point 14 to the position changed loading point 12', whereas a following vehicle 20' drives along the new driving path 10' to the waiting point 14' located at a position different from the position of the waiting point 14 for the preceding vehicle 20. Since the waiting point 14 for the preceding vehicle 20 is made different from the waiting point 14' for the following vehicle 20', it is possible to establish the waiting point 14' for the following vehicle 20' at a position which is more suitable for the new loading point 12', in other words, which is closer to the new loading point 12', and from which it takes shorter time to arrive at the new loading point 12'. In other words, in the case where the same loading point 12' is to be arrived, when comparison is made between the partial driving path 15 by way of the waiting point 14 and the new driving path (whole driving path) 10' by way of the waiting point 14', it turns out that the driving along the new driving path 10' contributes to better production efficiency on driving such as driving distance is shorter, etc. Such optimality of coarse between the waiting point and the loading point contributes to the productivity, which makes it possible to further improve the production efficiency.

In addition, the preceding vehicle 20 and the following vehicle 20' can drive successively in the loading site 1 without interfering with each other, from which also the improvement of the productivity can be expected.

DETAILED DESCRIPTION OF THE INVENTION

Exemplary embodiments of the vehicular driving system according to the present invention will be described below with reference to the accompanying drawings. Incidentally, in the exemplary embodiments, it is assumed that vehicles are unmanned off-road dump trucks. Further, it is assumed that a loader is a manned shovel. Incidentally, not only hydraulic shovel but also other types of loaders such as backhoe, excavator and wheel loader are naturally applied to the present invention.

Figure 7:
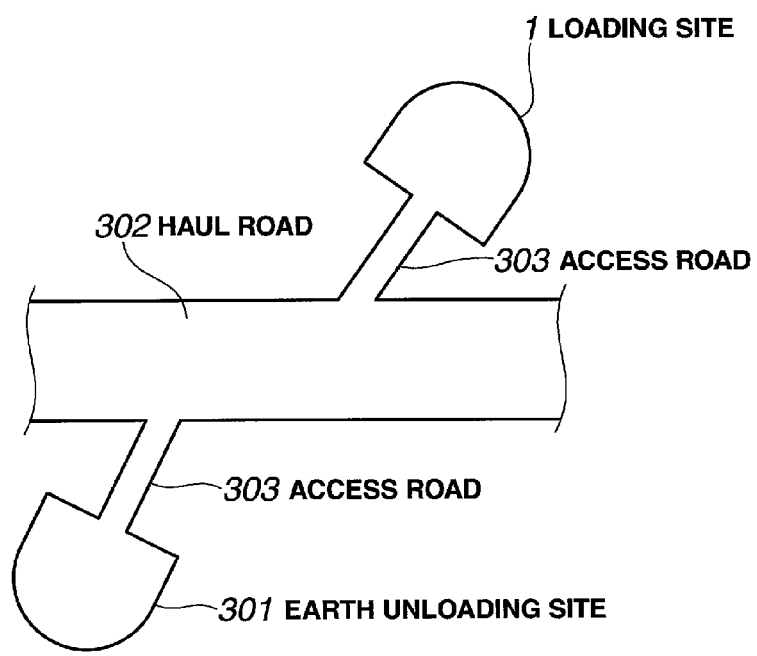
FIG. 7 is a top plan view of a working site.

Referring to FIG. 7, a working site includes such areas as a loading site 1, an earth unloading site 301, a fuelling station not shown in the accompanying drawings and a vehicle parking lot not shown in the drawings. These areas are connected by a well-maintained conveying road called a haul road 302, by a side track called an access road 303 leading from the haul road 302 to each area or by a crossing.

The loading site 1, which is one of the areas, is a place where a loading operation of loading earth and sand onto vehicles is performed, and in the loading site 1, an excavation operation by the loader such as wheel loaders (front-end loaders), backhoes and shovels (for example, hydraulic shovels) and a loading operation of loading earth and sand onto dump trucks are performed.

FIG. 2 is top plan views of the loading site 1.

A vehicle 20 drives, by being guided, along a driving path 10 in the loading site 1 from an entry point 11 to a loading point 12 where a manned loader 1 exists. Here, the entry point 11 is a pre-established point at which a haul road on which the vehicle 20 drives intersects with the loading site 1. Also, a waiting point 14 is established on the driving path 10 as a point at which the vehicle 20 must stand by until permission is given from the loader 30. As the waiting point 14, a switch-back point 13, for example, is determined.

In this description, for convenience of explanation, the switch-back point 13 is determined as the waiting point 14. However, the waiting point 14 is not necessarily limited to the switch-back point 13.

In the case where a shovel or backhoe, for example, is used as the loader 30, the waiting point 14 is often established at a point on the driving path 10 away from the loading point 12 by a given distance (set value). In the case where there is a switch-back point 13 located at a point closer to the loading point 12, however, the switch-back point 13 is determined as the waiting point 14.

Also, in the case where a wheel loader is used as the loader 30, an assumed working area for the wheel loader is created based on the position and set largeness of the loading point 12, the position, between the entry point 11 and the loading point 12, where the driving path 10 interferes with the assumed working area at the first time is often determined as the waiting point 14. In the case, however, where the switch-back point 13 is located on the side of the entry point 11 rather than on the side of the above-mentioned interfering point, the switch-back point 13 is determined as the waiting point 14. Incidentally, in the case where a wheel loader is used as the loader 30, a driving path without a switch-back may sometime be created.

The driving path 10 is a path along which the vehicle 20 drives, and which extends from the entry point 11 to the loading point 12 by way of the waiting point 14 located in the neighborhood of the loading point 12. In the driving path 10, a driving path extending from the waiting point 14 to the loading point 12 is called "a driving path end portion 10a".

The driving path 10 is created based on the position information on the loading point 12 and the position information on the entry point 11. Incidentally, in the case where plural driving paths are created at different times, one first and another later, in order to differentiate them, the driving path created later is denoted by attaching a dash (') to reference numeral 10.

Specifically, the vehicle 20 enters the loading site 1 through the entry point 11, drives toward the waiting point 14 (switch-back point 13), performing a switch-back at the waiting point 14 (switch-back point 13), and stops at a stop point (spot point) which is the loading point 12, where earth and sand (cargo) are loaded in the load-carrying platform of the vehicle 20 by the working machine (bucket) 30a of the loader 30.

The vehicle 20 is provided with a driver's seat (cab) at a front portion of the vehicle body, and a load-carrying platform (vessel, body) at a rear portion of the vehicle body, and a front-wheel steering vehicle with front and rear wheels being provided.

The travelling direction of the vehicle 20 changes before and after the waiting point 14 (switch-back point 13) from forward to reverse. The vehicle 20 travels in the reverse movement toward the loading point 12 (stop point; spot point) and enters there.

When the position of the loading point 12 changes, a new driving path 10' extending from the entry point 11 to the position changed loading point 12' is created. The waiting point 14' established on the later-created driving path 10' is located at a position different from that of the waiting point 14 established on the first-created driving path 10 (see FIG. 2B). In the driving path 10', a driving path extending from the waiting point 14' to the position changed loading point 12' is called "a driving path end portion 10a".

Also, when the there occurs a position change in the loading point 12, the partial driving path 15 is created from the waiting point 14 to the position changed loading point 12'. The partial driving path 15 is created based on the position information on the position changed loading point 12' and the position information on the waiting point 14 on the driving path 14.

Incidentally, in order to differentiate both the loading point before the position change and the position changed loading point, the position changed loading point is denoted by attaching a dash (') to reference numeral 12 as stated above. In the same manner, in order to differentiate both the waiting point before the position change and the position changed waiting point, the position changed waiting point is denoted by attaching a dash (') to reference numeral 14 as stated above (see FIG. 2B).

Figure 3:
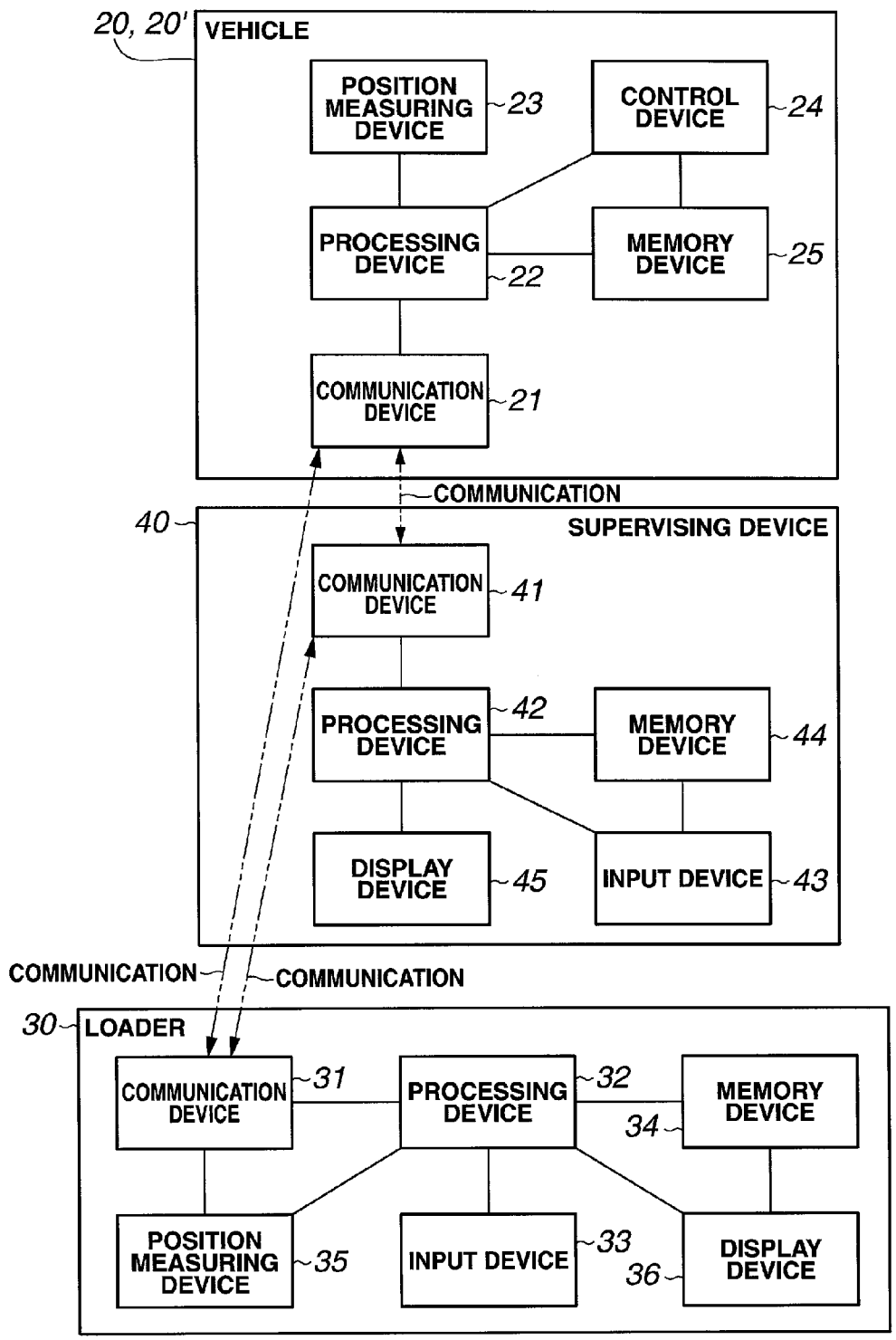
FIG. 3 is a block diagram illustrating an example of the vehicular driving system.

FIG. 3 is a block diagram of a vehicular driving system of an exemplary embodiment, in which in the case where plural vehicles drive in the loading site 1, a dash (') is attached to reference numeral 20 in order to differentiate one vehicle from another.

On the working site, there is provided a supervising device 40 serving as supervising and monitoring a large number of vehicles 20, 20' and so forth. The supervising device 40 includes a communication device 41, a processing device 42, an input device 43, a memory device 44 and a display device 45.

On the other hand, the vehicles 20, 20' are provided with a communication device 21, a processing device 22, a position measuring device 23, a control device 24 and a memory device 25, respectively.

The loader 30 is provided with a communication device 31, a processing device 32, an input device 33, a memory device 34, a position measuring device 35, and display device 36.

At the position measuring device 23 mounted in the vehicles 20, 20', measurement is made for the position of the vehicles of its own. As means for position measurement, a tire revolution number sensor and a gyroscope provided at the vehicles 20, 20', for example, are used. The position of the vehicle is measured based on the output signal of the tire revolution number sensor and the output signal of the gyroscope. Alternatively, the position of the vehicle may be measured by receiving signals transmitted from a GPS satellite through a GPS antenna, then the signals being detected by a GPS sensor.

The position information measured at the vehicles 20, 20' is processed by the processing device 22, and is transmitted to the supervising device 40 through the communication device 21.

The communication device 41 of the supervising device 40 receives the position information transmitted from the plural vehicles 20, 20' and so forth. The received position information is used for supervising and monitoring the plural vehicles 20, 20' as well as for creating the driving paths 10, 10' and the partial driving path 15.

Figure 6:
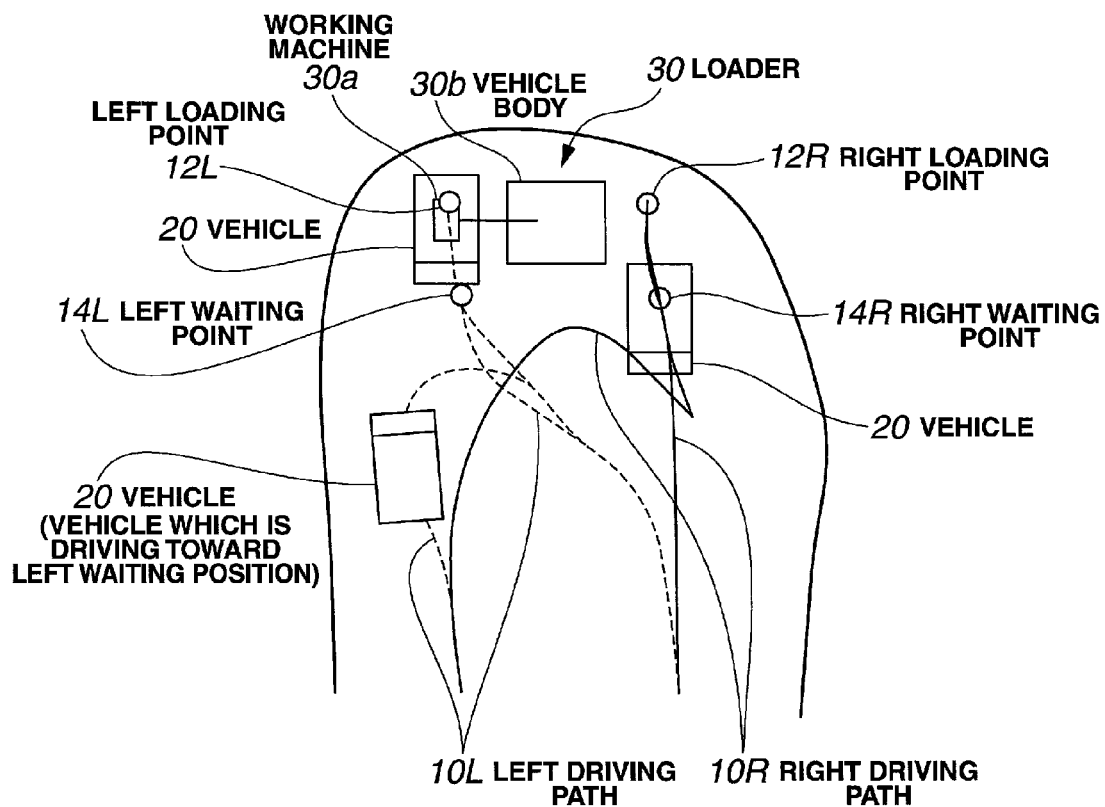
FIG. 6 is a top plan view illustrating a state in which two vehicles take turns to make an approach for loading on the right side and left side of a loader when both-sides loading is employed as a manner of loading.

The loader 30 such as a shovel changes successively its loading point 12 due to its movement or the like to a new excavation site. Incidentally, the phrase "a movement or the like" is used because there is a case where the loading point 12 is changed by the swivel of the working machine (bucket) while the loader 30 itself is unmoved. Specifically, as shown in FIG. 6, the loading position of the loader 30 exists at each position of the working machine 30a swiveling from right to left. Right and left swiveled positions are called right loading point 12R and left loading point 12L, respectively. As for a manner of loading, the shovel may sometimes perform both-sides loading. In this case, two vehicles take turns to make an approach for loading to the right side and left side of the loader 30, alternately. Consequently, a shovel serving as the loader 30 holds separate right and left driving paths 10R and 10L at the same time, and when designation of, for example, the right loading point 12R is made again, a driving path 10R is created on the right side only which extends from the old waiting point 14R before the position change to the new loading point 12R after the position change, while the loading point 12L of the left driving path 10L is not changed, and the left driving path 10L is not affected. However, in the case where the loader 30 is a backhoe or in the case where the both-sides loading is not selected even though the loader 30 is a shovel, and when the change is made from the right loading point 12R to the left loading point 12L, the situation is handled as if the loading point 12 has been changed.

At the position measuring device 35 mounted in the loader 30, measurement is made for the position of the loader 30 of its own. When there occurs a position change of the loading point 12, the processing device 32 measures the position information on the loading point 12 based on the measured position of the loader 30 of its own, etc., and creates information on the order to change position indicating "the position of the loading point 12 has been changed". The position information on the loading point 12 and the information on the order to change position (hereafter, called position change order information) are transmitted to the supervising device 40 through the communication device 31. In the case where the loader 30 is a manned vehicle, an operator of the loader 30 manually performs an operation to order the position change of the loading point 12.

At the communication device 41 mounted on the supervising device 40, the position information and the position change order information on the loading point 12 transmitted from the loader 30 is received. The received the position information and the position change order information on the loading point 12 are used for supervising and monitoring the loader 30 as well as for creating the driving paths 10, 10' and the partial driving path 15.

The input device 43 of the supervising device 40 is inputted with known data on the loading site 1 necessary for creating the driving paths 10, 10' and the partial driving path 15, such as the a range for the vehicles 20, 20' to drive and the position and direction of the entry point 11, etc.

At the processing device 42 of the supervising device 40, the driving paths 10, 10' and the partial driving path 15 are created based on the vehicle position information transmitted from the vehicles 20, 20', the position information and the position change order information on the loading point 12 transmitted from the loader 30 and the known data on the loading site 1, and also a drive order is created. Here, the drive order is a data whose content is to order that, along which of the driving paths 10, 10' and the partial driving path 15, the vehicles 20, 20' must drive.

The information on the created driving paths 10, 10' and partial driving path 15 as well as the drive order are transmitted to the vehicles 20, 20' through the communication device 41.

At the communication device 21 of the vehicles 20, 20', the information on the driving paths 10, 10' and the information on the partial driving path 15 as well as the drive order transmitted from the supervising device 40 are received. At the memory device 25, the information on the driving paths 10, 10' and the information on the partial driving path 15 as well as the drive order transmitted from the supervising device 40 are stored.

The processing device 22 of the vehicles 20, 20' creates control orders for driving and steering the vehicles 20, 20' of its own based on the information on the driving paths 10, 10' and the information on the partial driving path 15 as well as the drive order. These control orders are outputted to the control device 24. As a result, the control device 24 controls the driving and steering of the vehicles 20, 20' of its own, thereby to cause the vehicles 20, 20' to be driven and steered along the driving paths 10, 10' and the partial driving path 15.

First Embodiment

Explanation will now be made below with reference to the flowchart illustrated in FIG. 4 together with FIG. 2.

Figure 4A:
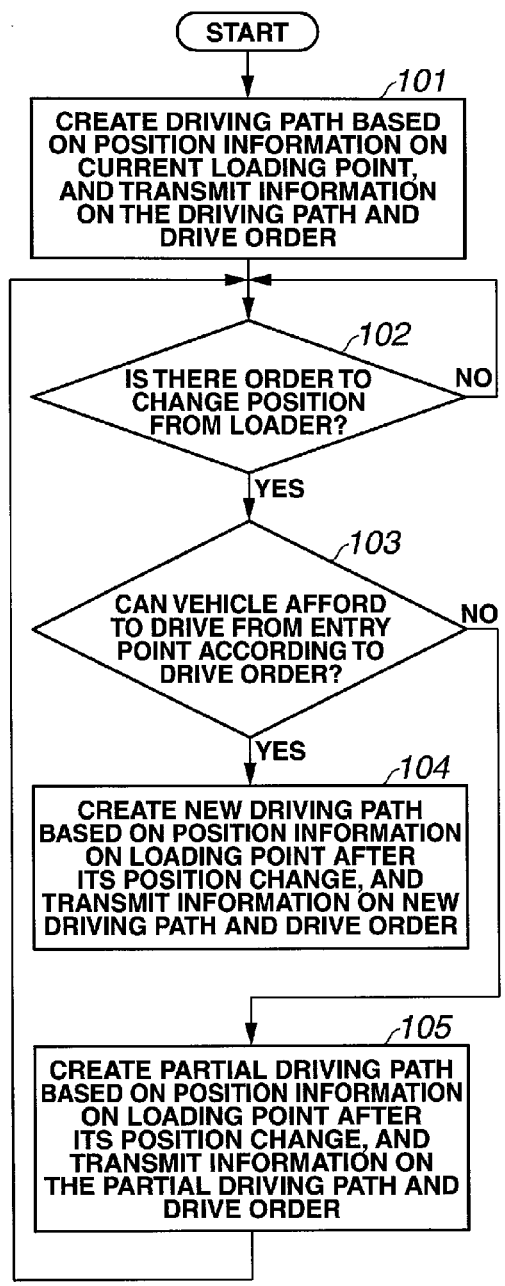
FIGS. 4A and 4B are flowcharts illustrating the procedure to be followed in the first embodiment.
Figure 4B:
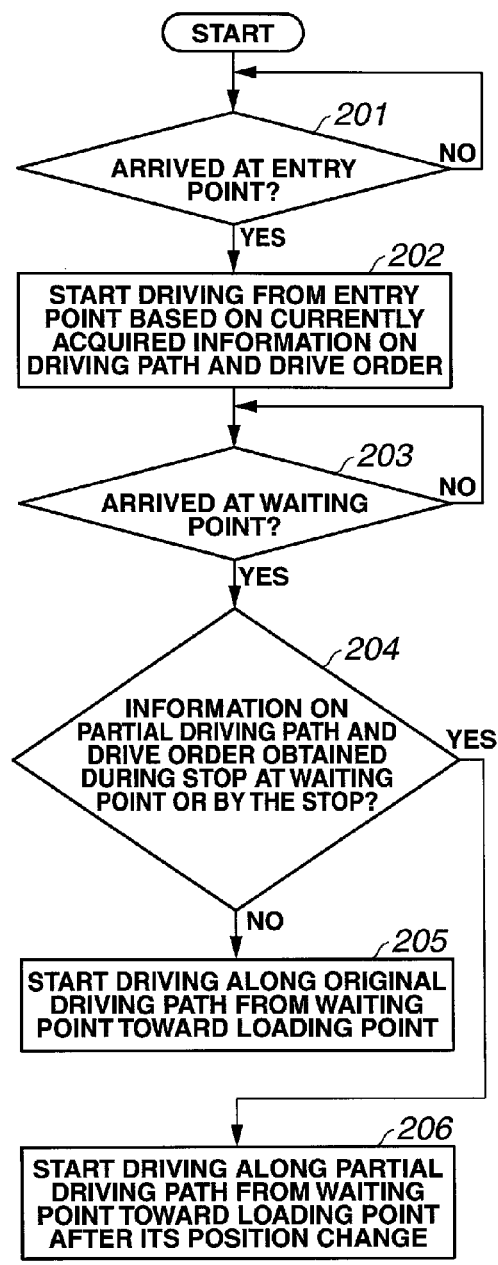

FIG. 4A is a flowchart illustrating the procedure to be followed at the supervising device 40, and FIG. 4B is a flowchart illustrating the procedure to be followed at the vehicle 20.

First, at the supervising device 40, on the basis of the position information on the current loading point 12, the driving path 10 extending from the entry point 11 to the current loading point 12 is created, and the information on the created driving path 10 and the drive order whose content is "drive along this drive path 10" are transmitted to the vehicle 20 (step 101).

Next, judgment is made as to whether there is an order to change the position of the loading point from the loader 30 (step 102).

If there is the order for the position change from the loader 30, the judgment is then made as to whether or not the vehicle 20 exists before the entry point 11 and can afford to drive from the entry point 11 in accordance with a new drive order (step 103). Here, "whether or not the vehicle 20 . . . can afford to" is judged based on whether or not the vehicle 20 has enough time to receive a new drive order and to perform a drive control by switching to a new driving path from the entry point 11. In other words, in order to avoid a temporary stop or speed reduction at the entry point 11, it is necessary for the vehicle 20 to receive a drive order for the driving path 10 or 10' sufficiently before the entry point 11. Therefore, under the situation where even though the vehicle 20 has not yet arrived at the entry point 11, the vehicle 20 has already received a drive order for the driving path 10, and started performing the drive control based on the drive order, it is impossible to switch to the new driving path 10'.

As a result, if it is judged that the vehicle 20 can afford to drive from the entry point 11 in accordance with the new drive order (YES in step 103), a new driving path 10' from the entry point 11 to the position changed loading point 12' is created based on the position information on the position changed loading point 12', and information on the created new driving path 10' and the drive order whose content is "drive along this new drive path 10'''" are transmitted to the vehicle 20 (step 104).

On the other hand, if it is judged that the vehicle 20 cannot afford to drive from the entry point 11 in accordance with the new drive order (NO in step 103), a partial driving path 15 is created from the waiting point 14 to the position changed loading point 12' based on the position information on the position changed loading point 12', and information on the partial driving path 15 and the drive order whose content is "drive along this partial drive path 15" are transmitted to the vehicle 20 (step 105).

Figure 1A:
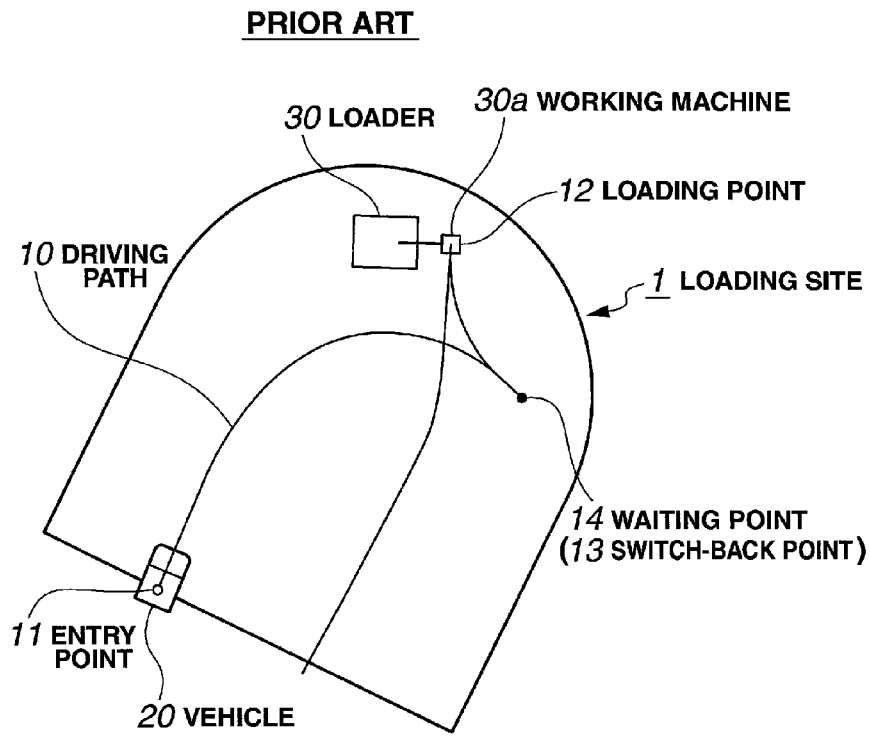
FIGS. 1A and 1B are top plan views of a loading site to be referred to when prior art is explained.
Figure 1B:
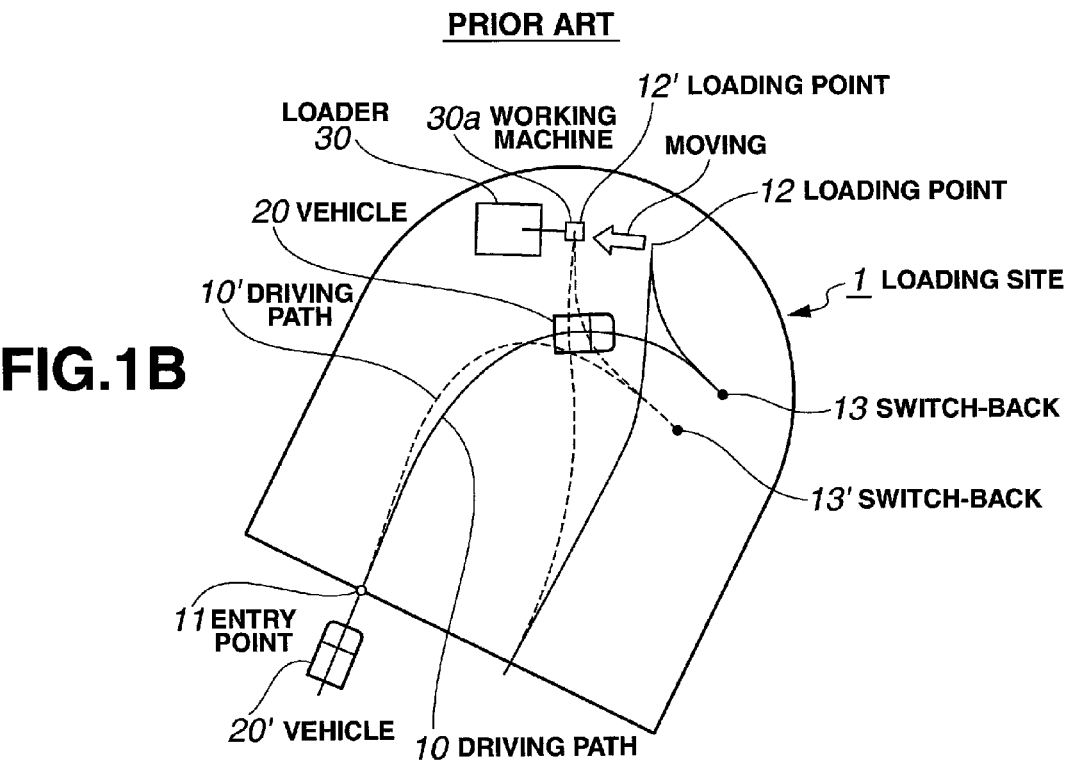
Figure 2A:
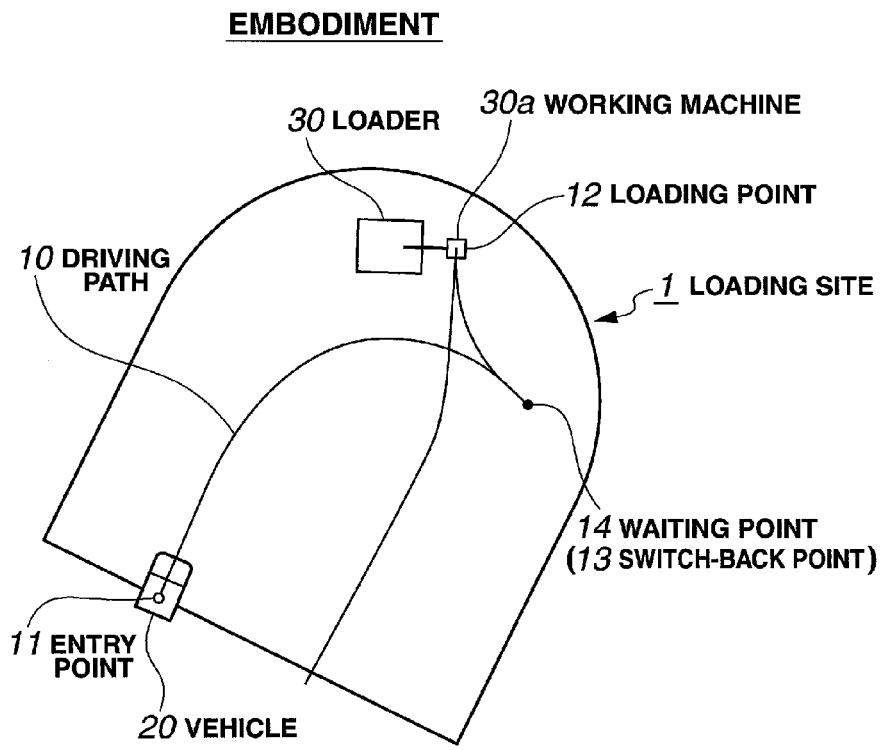
FIGS. 2A and 2B are top plan views of the loading sited to be referred to when embodiments are explained.

At the vehicle 20, judgment is made as to whether or not the vehicle 20 has arrived at the entry point 11 of the loading site 1 (step 201), and at the time of arrival at the entry point 11, the vehicle 20 starts driving from the entry point 11 in accordance with the information on the driving path and drive order received from the supervising device 40 and currently acquired. If the information on the driving path 10 and the drive order whose content is "drive along this drive path 10" are currently acquired, the vehicle 20 starts driving along the driving path 10 from the entry point 11 in accordance with the acquired information and drive order (FIG. 2A). Incidentally, if the information on the new driving path 10' and the drive order whose content is "drive along this new drive path 10'''" are acquired by the time of arrival at the entry point 11, the vehicle 20 starts driving along the new driving path 10' from the entry point 11 in accordance with the acquired information and drive order (step 202; refer to dashed line in FIG. 2B).

Referring now to FIG. 2A, explanation will be made below, concerning the process to be performed after the vehicle 20 starts driving along the driving path 10.

Then, at the vehicle 20, judgment is made as to whether or not the vehicle 20 has arrived at the waiting point 14 (step 203). As a result, if it is judged that the vehicle 20 has arrived at the waiting point 14 (YES in step 203), the vehicle 20 stands by at the waiting point 14 until a driving permission is given by the loader 30.

Usually, the loader 30 performs ground-leveling work, loading position movement work, etc. at the loading point 12. Such work differs depending on the situations or the proficiency level of operators, which makes the estimation impossible by the system. Therefore, the vehicle stands by until an order is given by an operator of the loader 30 after the loader 30 has completed a preparation for accepting the entry of the vehicle 20 into the loading point 12. If this process is automated, it might occur that the vehicle 20 has already started from the waiting point 14 toward the old loading point 12 when the order is given for the position of the subsequent loading point 12. To prevent that, it is configured that the vehicle 20 must stand by without fail until an order is given by an operator of the loader 30. Incidentally, as will be described later, when the loader 30 has already completed the preparation, the operator of the loader 30 is supposed to give an order for the loading point 12 while the vehicle 20 is driving toward the waiting point 14. Therefore, if the vehicle 20 is given an order for permission to drive, it does not have to stop at the waiting point 14. There is a case in which the vehicle 20 continues to drive. In such a case, the vehicle 20 keeps on driving up to the loading point 12 without stopping at the waiting point 14. During driving up to the loading point 12, if there is a spot where a temporary stop is absolutely required such as the switch-back point 13, the vehicle 20 stops there temporarily, and shortly after, starts and keeps on driving.

And, judgment is made as to whether or not the supervising device 40 has obtained the information on the partial driving path 15 and the drive order whose content is "drive along this partial drive path 15" while the vehicle 20 stops at the waiting point 14 or by the time when the vehicle 20 stops there (step 204).

If the supervising device 40 has not obtained the information on the partial driving path 15 and the drive order whose content is "drive along this partial drive path 15" while the vehicle 20 stops at the waiting point 14 or by the time when the vehicle 20 stops there (NO in step 204), the vehicle 20 starts driving along the original driving path 10 from the waiting point 14 toward the loading point 12 (step 205).

Figure 2B:
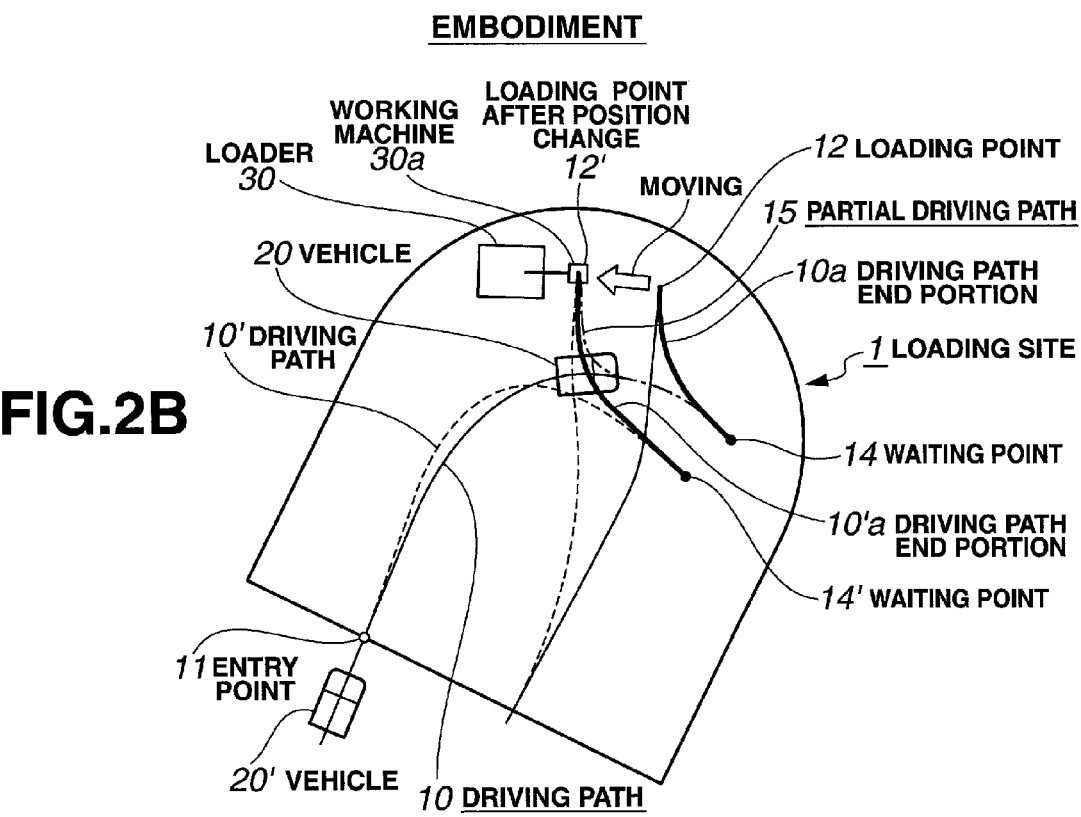

On the other hand, if the supervising device 40 has obtained the information on the partial driving path 15 and the drive order whose content is "drive along this partial drive path 15" while the vehicle 20 stops at the waiting point 14 or by the time when the vehicle 20 stops there (YES in step 204), the vehicle 20 starts driving along the partial driving path 15 from the waiting point 14 toward the position changed loading point 12' (step 206; FIG. 2B).

As described above, when there is the order to change the position of the loading point 12 while the vehicle 20 is standing by at the waiting point 14 or is driving between the entry point 11 and the waiting point 14, a partial driving path 15 is created, and the vehicle 20 drives from the waiting point 14 to the position changed loading point 12' along the partial driving path 15 (FIG. 2B). On the other hand, when there is not the order to change the position of the loading point 12 while the vehicle 20 is standing by at the waiting point 14 and is driving between the entry point 11 and the waiting point 14, the vehicle 20 keeps on driving from the waiting point 14 to the loading point 12 along a driving path end portion 10*a* (FIG. 2A).

Consequently, according to the first embodiment, the following advantageous effect is generated.

Specifically, the vehicles 20, 20' are made stand by at the waiting point 14 until permission is given from the loader 30, and when the there occurs a position change in the loading point 12, the partial driving path 15 is created from the waiting point 14 to the position changed loading point 12', and the vehicle 20 is made drive along the partial driving path 15. Therefore, even in the case where the loading point 12 changes successively due to a movement or the like of the loader 30, it is possible for the vehicle 20 to drive without fail toward the loading point 12. Since the waiting point 14 is established close to the loading point 12 so that the vehicle 20 can drive up to the waiting point 14 without being stopped, it is possible for the vehicle 20 to keep on driving so that the vehicle 20 can be as close to the loader 30 as possible without making the vehicle 20 stopped (without waiting time) as much as possible. Thus, production efficiency can be improved.

The above-described process can naturally be applied to the case where plural vehicles 20, 20' drive along the drive path 10 one after another. In this case, "vehicle 20" should be replaced with "plural vehicles 20, 20'" in the above description, and performs the process accordingly. In the case where plural vehicles 20, 20' enter the loading site 1 one after another, waiting time becomes not accumulated, and as a result, the production efficiency will be improved further. Incidentally, in the case where plural vehicles 20, 20' enter the loading site 1 one after another, an appropriate measure is taken for each of the vehicles 20, 20' to drive appropriately so that they do not interfere with each other at the loading point 12, etc.

Second Embodiment

Next, an embodiment will be described below in which, in the case where a preceding vehicle 20 drives along the partial driving path 15, a vehicle following the preceding vehicle is forcibly made stand by before the entry point 11, and is made drive along a new driving path 10', that is, along a driving path 10' extending from the entry point 11 to the position changed loading point 12'.

Figure 5A:
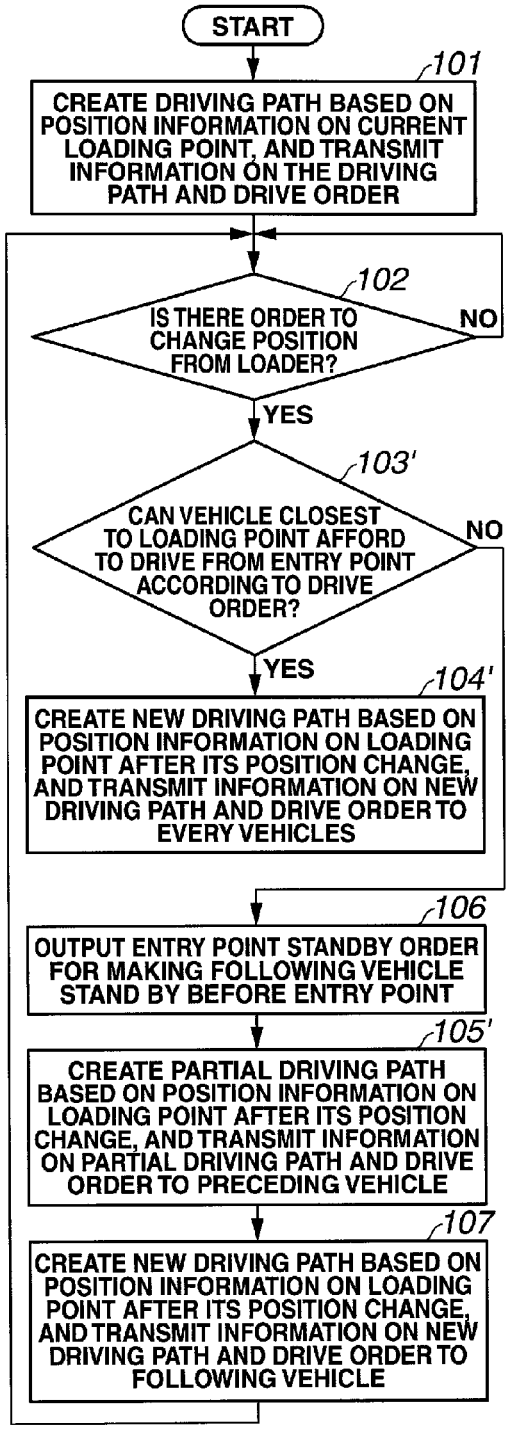
FIGS. 5A and 5B are flowcharts illustrating the procedure to be followed in the second embodiment.
Figure 5B:
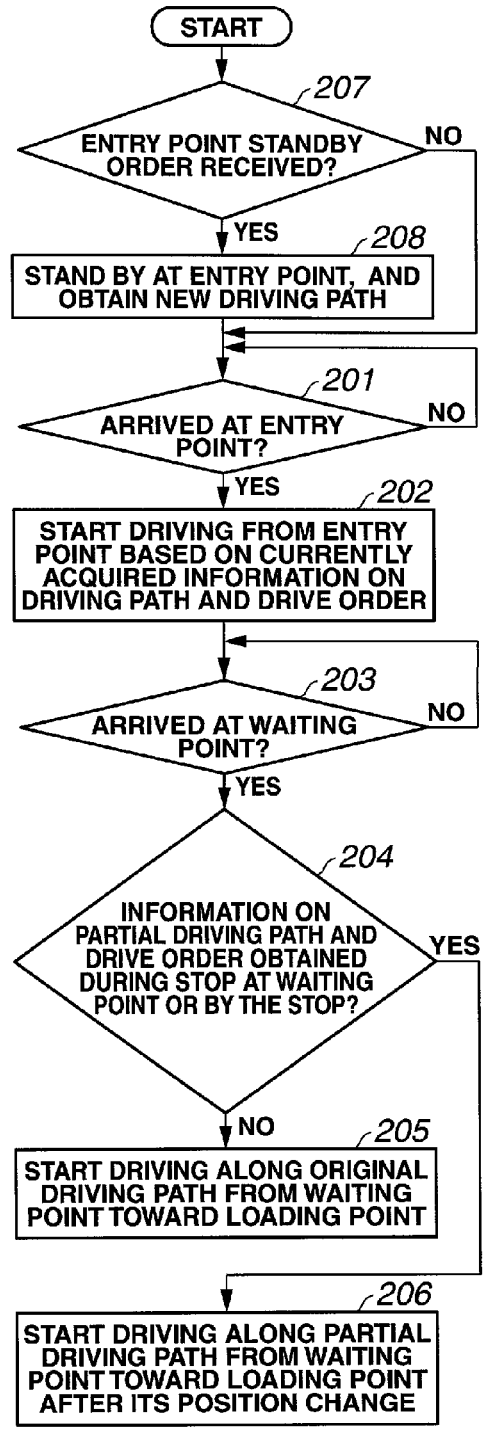

In this case, procedure should be taken by the supervising device 40 and the vehicles 20, 20' in accordance with the flowcharts shown in FIGS. 5A and 5B in place of the flowcharts shown in FIGS. 4A and 4B. Following is a description of portions of the procedure in FIG. 5 which are different in the procedure in FIG. 4A.

Referring to FIG. 5A, a process of steps 103', 104', 105', 106' and 107 is performed in place of steps 103, 104 and 105 in FIG. 4A. Also, referring to FIG. 5B, a process of steps 207 and 208 is performed before step 201 in FIG. 4B.

Specifically, the judgment is made as to whether or not the vehicle 20 which is currently the closest to the loading point 12 exists before the entry point 11 and can afford to drive from the entry point 11 in accordance with a new drive order (step 103'). As a result, if it is judged that the vehicle 20 which is currently the closest to the loading point 12 can afford to drive from the entry point 11 in accordance with a new drive order (YES in step 103'), a new driving path 10' is created from the entry point 11 to the position changed loading point 12', and information on the created new driving path 10' and the drive order whose content is "drive along this new drive path 10'" are transmitted to the vehicles 20, 20' (step 104').

On the other hand, if it is judged that the vehicle 20 which is currently the closest to the loading point 12 cannot afford to drive from the entry point 11 in accordance with the new drive order (NO in step 103'), an entry point standby order for making the vehicle 20' following the preceding vehicle 20 forcibly stand by before the entry point 11 is transmitted (step 106).

Having received the entry point standby order, the following vehicle 20' stands by before the entry point 11 (steps 207, 208).

At the supervising device 40, the partial driving path is created from the waiting point 14 to the position changed loading point 12', and the information on this partial driving path 15 and the drive order whose content is "drive along this partial drive path 15" are transmitted to the preceding vehicle 20 (step 105').

Further, at the supervising device 40, a new driving path 10' is created from the entry point 11 to the position changed loading point 12', and information on the created new driving path 10' and the drive order whose content is "drive along this new drive path 10'" are transmitted to the following vehicle 20' (step 107).

Having received the drive order, the following vehicle 20' drives from the entry point 11 along the new drive path 10' (steps 208, 201, 202).

As described above, as for the preceding vehicle 20, under the condition that there is an order to change the position of the loading point 12 while the preceding vehicle 20 is standing by at the waiting point 14 or is driving between the entry point 11 and the waiting point 14, the preceding vehicle 20 is made drive from the waiting point 14 to the position changed loading point 12' along the partial driving path 15, whereas as for a following vehicle 20', it is made drive along the new driving path 10' from the entry point 11 to the waiting point 14' located at a position different from the position of the waiting point 14 located on the partial driving path 15. Incidentally, the following vehicle 20' stands by at the waiting point 14' in the same manner, and drives along either a new partial driving path not shown in the accompanying drawings or the original driving path 10' depending on occurrence or nonoccurrence of the position change in the loading point 12' (steps 204, 205, 206).

Consequently, according to the second embodiment, the following advantageous effect is obtained.

Specifically, when the position of the loading point 12 has been changed, the preceding vehicle 20 drives along the partial drive path 15 from the waiting point 14 to the position changed loading point 12', whereas the following vehicle 20' drives along the new drive path 10' up to a waiting point 14' located at a position different from the position of the waiting point 14 for the preceding vehicle 20. Since the waiting point 14' for the following vehicle 20' is made different from the waiting point 14 for the preceding vehicle 2 as described above, the waiting point 14' for the following vehicle 20' can be set at the most appropriate position for the new loading position 12', that is, at the position which is closer to and can be arrived in a shorter time at the new loading position 12'. Specifically, comparison has been made between the partial drive path 15 and the new drive path (whole drive path) 10' in the case where the same loading point 12 is arrived. Then, it turns out that driving along the driving path 10' would enjoy better driving efficiency such as a shorter driving distance, etc. What influences the productivity greatly is among others a driving time between the waiting point and the loading point. Usually, while the loading operation is performed onto the preceding vehicle 20, the following vehicle 20' has arrived at the waiting point 14 and is waiting for the order from the operator of the loader 30. This is the reason that length of driving time between the waiting point and the loading point influences the productivity. Therefore, the optimization of the course between the waiting point and the loading point will contribute to the productivity, which will further improve the production efficiency.

In addition, this makes it possible for the preceding vehicle 20 and the following vehicle 20' to drive successively in the loading site 1 without interfering with each other, from which also the improvement of the productivity can be expected.

In the above-described embodiment, the switch-back point 13 is determined as the waiting point 14. However, it can be set at any point as long as the point is located on the driving path 10, close to the loading point 12 and is a point at which the vehicle 20 must stand by until a permission is given by the loader 30. For example, a point which is a predetermined distance away from the loading point 12 may be determined as the waiting point 14. Also, of points which are a predetermined distance away from the switch-back point 13 and the loading point 12, a point which is the closest to the loading point 12 may be determined as the waiting point 14.

In the above-described embodiment, the vehicle 20 is made stand by at the waiting point 14 without exception. However, it is sufficient to "stand by until permission is given", and it does not always have to stand by at the waiting points 14, 14'. If the drive permission has been given, the vehicles may pass through the waiting points 14, 14' as they are (without standing by). For example, when the vehicle 20 is getting close to the waiting point 14, the approval by the operator of the loader 30 is requested as to "whether it is unnecessary to stand by at the waiting point 14". As a result, if the preparation for loading onto the vehicle 20 has been completed, the operator transmits the permission to the effect that "driving may be permitted toward the loading point 12 without standing by at the waiting point 14". Having received this permission, the vehicle 20 keeps on driving toward the loading point 12 as it is without standing by at the waiting point 14. On this occasion, a sequence of the communication procedure may be conducted between the vehicle 20 and the loader 30 directly, or by way of the supervising device 40. Further, the time when the vehicle 20 requests the above-stated approval by the loader 30 may be set to the time when the distance from the vehicle 20 to the waiting point 14 reaches a predetermined distance, or to the time when the estimated time for the vehicle 20 to arrive at the waiting point 14 reaches a predetermined time.

Incidentally, in the above-described embodiment, it is so configured that the information on the position change is transmitted from the loader 30 to the supervising device 40, and the drive order is transmitted from the supervising device 40 to the vehicle 20. Alternatively, it may also possible to provide the function of the supervising device 40 to the loader 30 or the vehicle 20, and to perform communications directly between the loader 30 and the vehicle 20.

The invention claimed is:

1. A vehicular driving system for creating a driving path for vehicles along which a vehicle is to drive from an entry point of a loading site to a loading point where a loader exists, and for making the vehicle drive along the created driving path, wherein the system comprises:

driving path creating means for creating a driving path from the entry point of the loading site to a loading point by way of a waiting point located in a neighborhood of the loading point based on position information on the loading point and position information on the entry point;

first driving control means for making the vehicle drive from the entry point to the waiting point along the driving path created by the driving path creating means based on information on the driving path;

waiting means for making the vehicle stand by at the waiting point until a permission is given by the loader;

partial driving path creating means for creating, when the loading point has moved inside the same loading site and there is an order to change the position of the loading point from the loader to a supervising device and/or to the vehicle while the vehicle is standing by at the waiting point or driving between the entry point and the waiting point, a partial driving path from the waiting point to the position changed loading point based on position information on the position changed loading point and position information on the waiting point on the driving path before the loading point has moved; and second driving control means for making, when there is no order to change the position of the loading point from the loader to the supervising device and/or to the vehicle while the vehicle is standing by at the waiting point and driving between the entry point and the waiting point, the vehicle drive from the waiting point to the loading point along the driving path created by the driving path creating means based on the information on the driving path, and for making, when there is the order to change the position of the loading point while the vehicle is standing by at the waiting point or driving between the entry point and the waiting point, the vehicle drive from the waiting point to the position changed loading point along the partial driving path created by the partial driving path creating means based on the information on the partial driving path.

2. The vehicular driving system according to claim 1, wherein the vehicular driving system is applied to a case where a plurality of vehicles drive along the driving path one after another, the partial driving path creating means creates the partial driving path from the waiting point to the position changed loading point when there is the order to change the position of the loading point from the loader to the supervising device and/or to the vehicle, the driving path creating means creates a driving path from the entry point to the position changed loading point by way of a waiting point located at a position different from the position of the waiting point located on the partial driving path, a preceding vehicle is made to drive from the waiting point to the position changed loading point along the partial driving path created by the partial driving path creating means based on information on the partial driving path, and a following vehicle is made to drive from the entry point to the waiting point located at a position different from the position of the waiting point located on the partial driving path along the driving path created by the driving path creating means based on information on the driving path.

3. The vehicular driving system according to claim 1, wherein the vehicle is an unmanned vehicle and the loader is a manned vehicle, the vehicular driving system further comprises a supervising device, the vehicle, the supervising device and the loader are respectively provided with communication means for performing transmission/reception between the supervising device and the vehicle and between the supervising device and the loader, the loader transmits an order to change position to the supervising device, the supervising device creates a driving path and a partial driving path in accordance with the order to change position transmitted from the loader, the supervising device transmits information on the driving path and the partial driving path to the vehicle, and the vehicle drives based on the information on the driving path and the partial driving path transmitted from the supervising device, and stands by at the waiting point until the permission is given by the loader.

4. A vehicular driving method for creating a driving path for vehicles along which a vehicle is to drive from an entry point of a loading site to a loading point where a loader exists, and for making the vehicle drive along the created driving path, said method comprising:

creating a driving path from the entry point of the loading site to the loading point by way of a waiting point located in a neighborhood of the loading point based on position information on the loading point and position information on the entry point;

making the vehicle drive from the entry point to the waiting point along the driving path based on information on the created driving path;

making the vehicle stand by at the waiting point until a permission is given by the loader;

creating, when the loading point has moved inside the same loading site and there is an order to change the position of the loading point from the loader to a supervising device and/or to the vehicle while the vehicle is standing by at the waiting point or driving between the entry point and the waiting point, a partial driving path from the waiting point to the position changed loading point based on position information on the position changed loading point and position information on the waiting point on the driving path before the loading point has moved; and making, when there is no order to change the position of the loading point from the loader to the supervising device and/or to the vehicle while the vehicle is standing by at the waiting point and driving between the entry point and the waiting point, the vehicle drive from the waiting point to the loading point along the driving path created by the driving path creating means based on the information on the driving path, and making, when there is the order to change the position of the loading point while the vehicle is standing by at the waiting point or driving between the entry point and the waiting point, the vehicle drive from the waiting point to the position changed loading point along the partial driving path created by the partial driving path creating means based on information on the partial driving path.

5. The vehicular driving method according to claim 4, further comprising:

applying the vehicular driving method to a case where a plurality of vehicles drive along the driving path one after another; and when there is the order to change the position of the loading point from the loader to the supervising device and/or to the vehicle, creating, by the partial driving path creating means, the partial driving path from the waiting point to the position changed loading point, creating, by the driving path creating means, a driving path from the entry point to the position changed loading point by way of a waiting point located at a position different from the position of the waiting point located on the partial driving path, making a preceding vehicle drive from the waiting point to the position changed loading point along the partial driving path created by the partial driving path creating means based on information on the partial driving path, and making a following vehicle drive from the entry point to the waiting point located at a position different from the position of the waiting point located on the partial driving path along the driving path created by the driving path creating means based on information on the driving path.

6. The vehicular driving system according to claim 2, wherein the vehicle is an unmanned vehicle and the loader is a manned vehicle, the vehicular driving system further comprises a supervising device, the vehicle, the supervising device and the loader are respectively provided with communication means for performing transmission/reception between the supervising device and the vehicle and between the supervising device and the loader, the loader transmits an order to change position to the supervising device, the supervising device creates a driving path and a partial driving path in accordance with the order to change position transmitted from the loader, the supervising device transmits information on the driving path and the partial driving path to the vehicle, and the vehicle drives based on the information on the driving path and the partial driving path transmitted from the supervising device, and stands by at the waiting point until the permission is given by the loader.

* * * * *